Dec. 15, 1936.     B. L. COOKSON     2,064,056
DISPLAY STAND
Filed Dec. 9, 1935     4 Sheets-Sheet 1
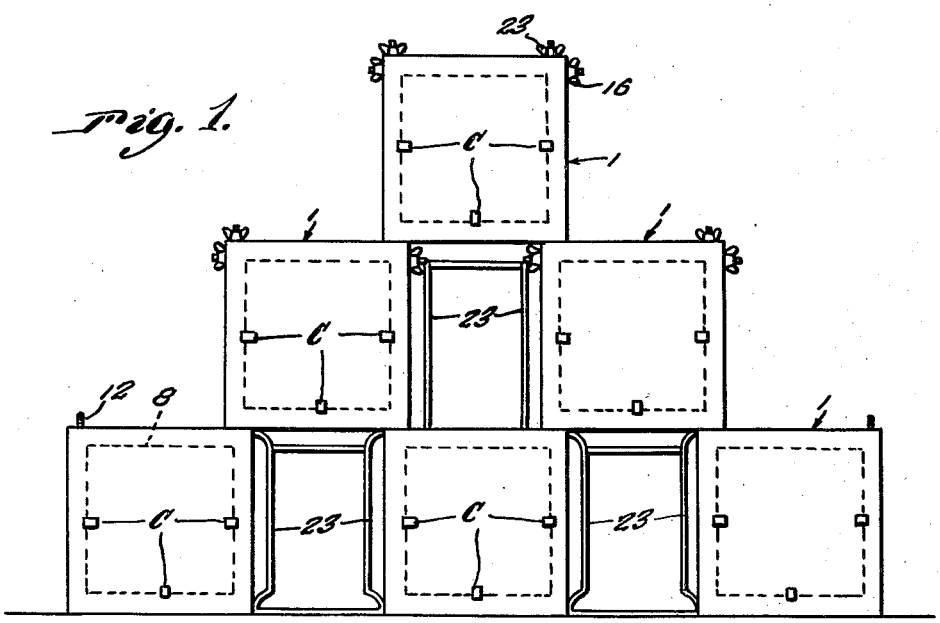
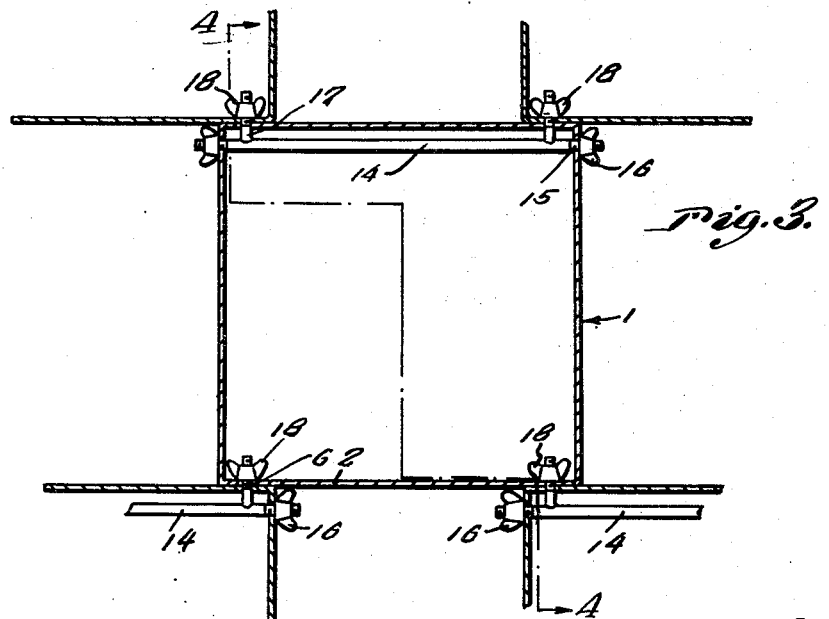
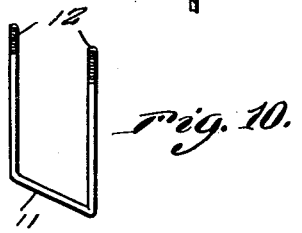
Inventor
B. L. Cookson
By Clarence A. O'Brien and
Hyman Berman
Attorneys Dec. 15, 1936.  B. L. COOKSON  2,064,056
DISPLAY STAND
Filed Dec. 9, 1935  4 Sheets-Sheet 2
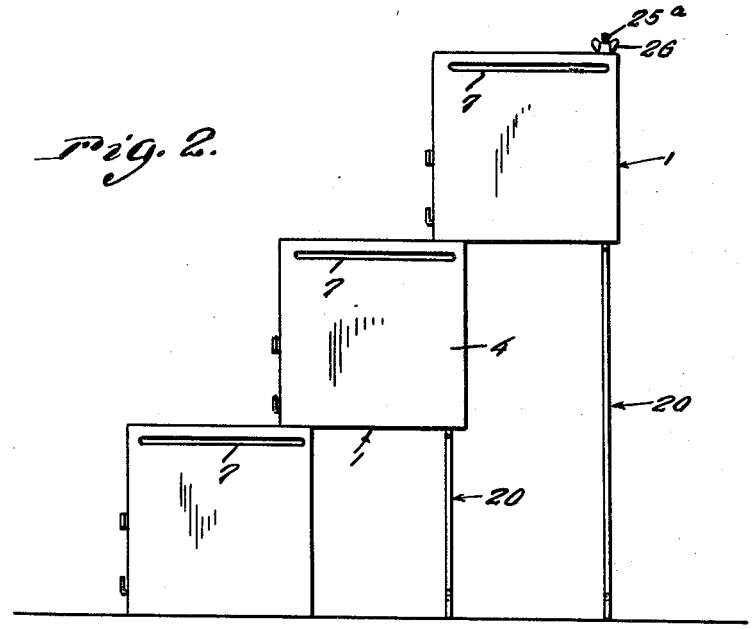
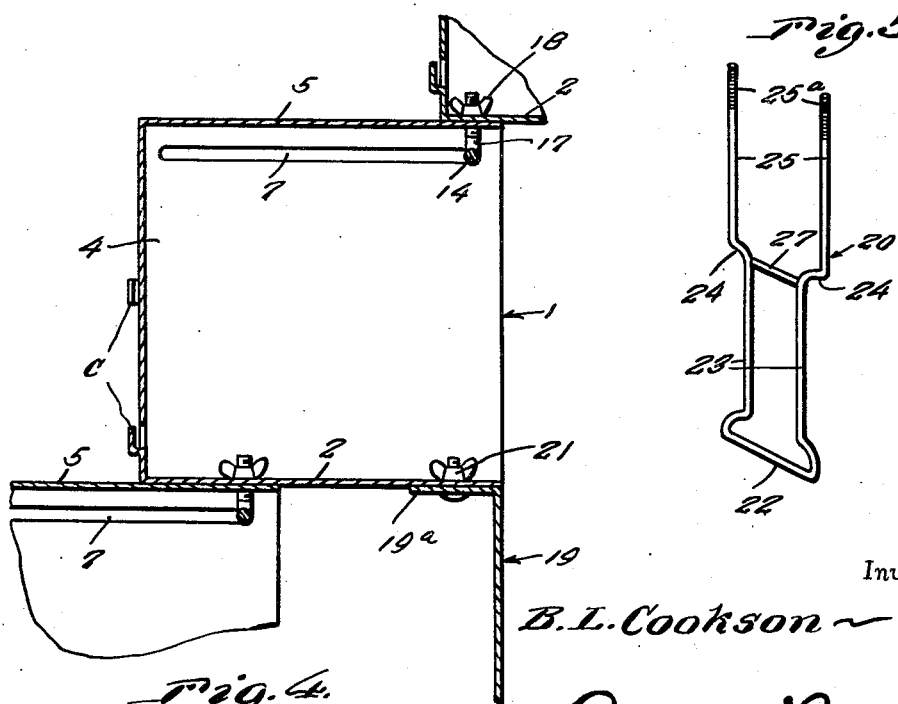
Inventor
B. L. Cookson
By Clarence A. O'Brien and
Hyman Berman
Attorneys Dec. 15, 1936.　　　B. L. COOKSON　　　2,064,056
DISPLAY STAND
Filed Dec. 9, 1935　　　4 Sheets-Sheet 3

Inventor
B. L. Cookson
By Clarence A. O'Brien and
Hyman Berman
Attorneys

Dec. 15, 1936.   B. L. COOKSON   2,064,056
DISPLAY STAND
Filed Dec. 9, 1935   4 Sheets-Sheet 4
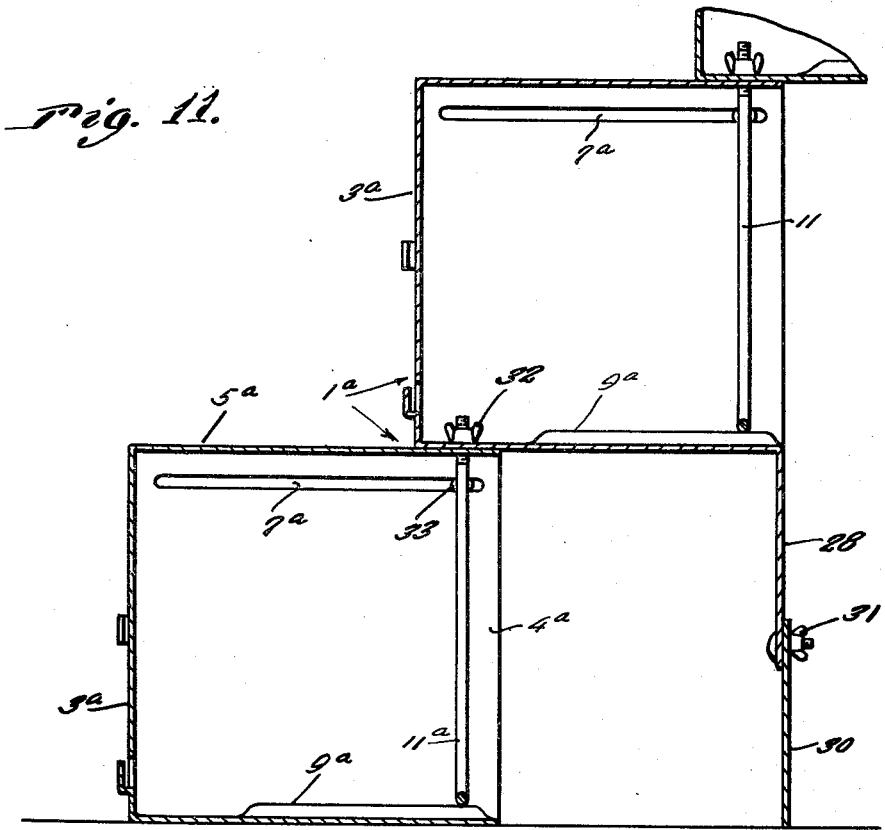
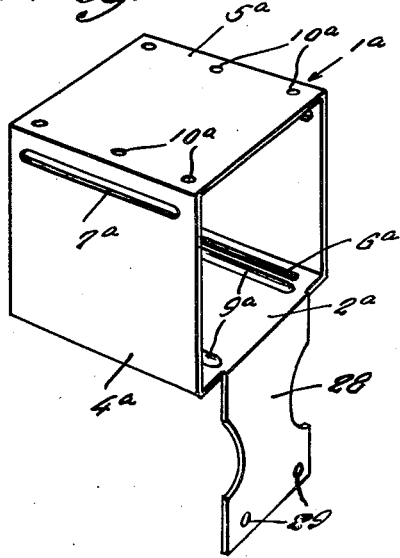
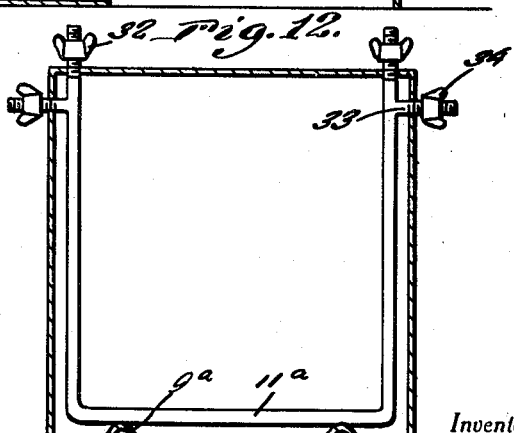
Inventor
B. L. Cookson
By Clarence A. O'Brien and
Hyman Berman
Attorneys Patented Dec. 15, 1936

2,064,056

UNITED STATES PATENT OFFICE 2,064,056

DISPLAY STAND

Byron L. Cookson, Benton Harbor, Mich.

Application December 9, 1935, Serial No. 53,622

8 Claims. (Cl. 211—148)

This invention relates to display stands for displaying articles of merchandise for advertising purposes and in a novel and effective manner.

The invention together with its objects and advantages will be best understood from a study of the following description taken in connection with the accompanying drawings wherein:

Figure 1 is a front elevational view of a display stand involving the features of the present invention.

Figure 2 is a side elevational view of the stand.

Figure 3 is an enlarged sectional view showing a slightly different arrangement of the unit in constructing a stand therefrom.

Figure 4 is a detail view taken substantially on the line 4—4 of Figure 3.

Figure 5 is a perspective view of a unit supporting member.

Figure 9 is a fragmentary detail sectional view through one of the units illustrating certain details hereinafter more fully referred to.

Figure 10 is a perspective view of a connecting member also forming part of the invention.

Figure 11 is a vertical sectional view illustrating still another form of the invention.

Figure 12 is a sectional view through one of the units shown in Figure 11, and

Figure 13 is a perspective view of a modified form of unit shown in Figure 11.

Figure 6:
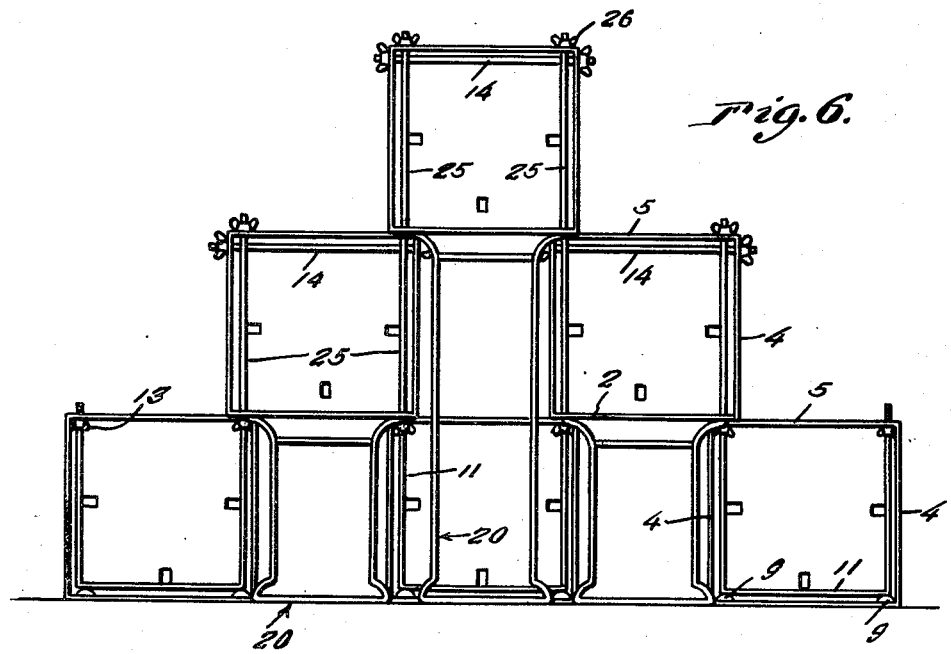
Figure 6 is a rear elevational view of the stand shown in Figure 1.
Figure 7:
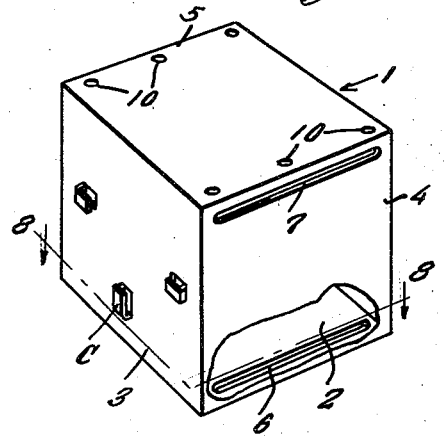
Figure 7 is a perspective view of one of the units with certain parts broken away.
Figure 8:
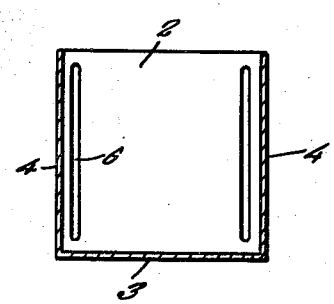
Figure 8 is a view taken substantially on the line 8—8 of Figure 7.

Referring to the drawings by reference numerals it will be seen that I provide any desired number of units 1. Each of the units 1 is of a hollow box like structure, square, rectangular or any other desired similar shape, being open at its back and including a bottom wall 2, front wall 3, side walls 4 and top wall 5.

The majority of the units 1 have in the bottom walls 2 thereof adjacent each of the side walls 4 elongated slots 6 and similar slots 7 in the side walls 4 adjacent the top of the units. Also all of the units 1 have on the front walls thereof a suitable arrangement of clips 7 either struck out therefrom or otherwise secured thereto in a suitable manner to support an advertising card or the like 8.

Figure 9:
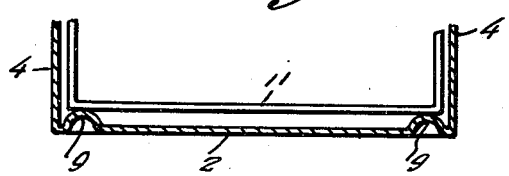

Several of the units 1, and particularly those units which are to be used in forming the bottom or base tier of the display stand instead of having slots 6 in the bottom wall thereof have elongated ribs 9 pressed upwardly from said bottom wall as shown in Figure 9.

Each of the units 1 has in the top wall 5 thereof adjacent its respective side edges a series, preferably three, of openings or apertures 10.

For use in connection with those units 1 equipped with ribs 9 and used in forming the base or bottom tier of the stand there are provided, to a suitable number, substantially U-shaped members 11 the sides of which have threaded terminals 12 to accommodate wing nuts or the like 13.

As best shown in Figures 6 and 9 the members 11 are arranged in the open end of the units 1 with the closed end of the U's resting on the ribs 9 and the sides of the U's extending upwardly through selected openings 10 preferably adjacent the rear edge of the top walls 5 of units 1, and the nuts 13 threaded home against the under side of the tops 5 of said units.

The base units 1 are arranged in laterally spaced relation, the spaces therebetween being bridged by the units 1 forming the second tier. To secure the units 1 of the second tier to the units 1 of the base or lower tier each of the members 11 have at least one of its ends 12 extending upwardly through the slots 6 in the said units 1 forming the second tier whereby said units of the second tier are connected in a substantial manner with the units of the lower or base tier, and the units arranged in step formation, that is to say with the front wall of the units 1 of the upper tier spaced back toward the rear end or materially away from the front walls of the base units 1 as best suggested in Figure 2.

Likewise, and where for example but six units are used in forming the stand the single unit forming the third tier bridges the space between the units 1 forming the second tier and the said unit 1 forming the third tier is secured to the units 1 forming the second tier in any of the following manners.

For example to secure the unit 1 of the third or uppermost tier to the units 1 of the second tier there may be employed in connection with said units rods 14 each of which has its respective opposite ends threaded as at 15 to extend through the slots 7 in the units 1 forming the second tier, and engaged with the ends 15 are wing nuts 16.

Also each of the rods 14 slightly inwardly from the respective opposite ends 15 thereof has upstanding shanks or projections 17 that are accommodated in selected openings 10 of the said units 1 of the second tier, and these projections 17 are also accommodated in the slots 6 in the bottom of the unit 1 forming the third tire. Cooperating with the threaded ends of the pins or projections 17 are wing nuts 18 for securing the mentioned units together.

In Figures 3 and 4 is illustrated a second manner in which the bars 14 may be used for connecting five units 1 together with each of four units secured to a fifth unit.

The units forming the second and third tier of the stand shown in Figures 1 and 6, for example, may have their rear portions supported through the medium of supports 19 or 20 as found desirable. The supports 19, as shown in Figure 4 merely consist of standards formed of metal or other suitable material having at their upper ends lateral projections 19a adapted to be bolted as at 21 to the bottom wall of the projecting rear portion of an uppermost unit 1, the base of the standard 19 resting on the floor or other suitable support. In this connection it will be understood that the standards 19 are provided in different lengths for supporting the rear portions of the units forming the second, third, ad infinitum tier units.

Each of the supporting standards 20 is preferably formed from a single length of wire bent into a substantial U to provide a base 22 having sides 23 rising therefrom and offset intermediate their ends as at 24 to provide shoulders and then continuing upwardly from said shoulders as at 25 to terminate in threaded extremities 25a.

It will also be understood that the standards 20 will come in varying length for supporting the units of the various tiers.

In using the standards 20 the portions 25 of the sides of said standards extend upwardly through the slots 6 in the bottoms 2 of, for example, the units 1 of the second tier, and the threaded terminals 25a extend upwardly through selected openings 10 in said units and into the unit of the third tier through the slots 6 in the bottom of the last named units, wing nuts 26 being provided for the threaded end 25a as will be clear from a study of Figure 6. In connection with the above it will be noted that the shoulders 24 provide rests for example, for the bottom walls of the second tier of units 1. Also at the shoulder portions thereof the sides of the standards 20 may be connected by a suitable brace bar 27.

It will be understood that in actual practice the units, connecting members and standards may be interchanged and rearranged as found most desirable and most effective, and in accordance with the desired final form of the display stand to be erected or constructed therefrom.

In the form of the invention shown in Figures 11 to 13 inclusive each of the units therein indicated by the reference numeral 1a includes a front wall 3a, a bottom wall 2a, side walls 4a, and a top wall 5a.

Each of the units is provided in the top wall thereof with openings 10a adjacent opposite side edges of the top wall, while in the side walls 4a thereof each of said units is provided with a slot 7a.

The units in the form of the invention shown in Figures 11 to 13 inclusive differ however from the unit 1 in that each of the units 1a has in the bottom wall 2a thereof and adjacent opposite sides of the unit slots 6a corresponding to the slots 6 of the unit 1 and raised humps or ribs 9a adjacent to and paralleling the slots 6a corresponding to the ribs or humps 9 of the base unit 1.

Also in accordance with the present invention the majority of the units 1a, and especially those units 1a which are to be used in forming the upper tier of the stand each has formed integral, preferably, with its bottom 2a at the open side of the unit a supporting standard section 28 provided adjacent its lower edge with openings 29.

Complemental to the standard section 28 is a supporting standard 30 which is formed adjacent its upper end with slots adapted to register with the openings 29 for accommodating bolt and wing nut means 31 for securing a standard section 28 and its complemental section 30 at the desired adjustment relative to one another.

Thus it will be seen from a study of Figure 11 that the standard section 30 may be supplied in suitable lengths for use in conjunction with the standard section 28 for supporting the units 1a forming the second, third, etc., tiers of units at the rear open side of said units.

Further in this form of the invention is illustrated a modified form of tie member 11a which combines the features of the hereinbefore described tie member 11 and tie member 14. The tie member 11a as shown comprises a substantially U-shaped rod the terminals of the sides of which are threaded to extend through a pair of openings 10a in the top of one section and the slots 6a in the bottom of the next adjacent section or unit 1a to cooperate with wing nuts 32 for securing two of said sections together as suggested in Figure 11.

Further the sides of the member 11a downwardly from their free terminals are provided with laterally projecting pins or extensions 33 adapted to extend through the slots 7a, and these extensions 33 are provided with suitable wing nuts 34.

As will be understood the extensions 33 and wing nuts 34 will serve for securing two or more sections 1a together with adjacent sides of the units 1a in intimate contact one with the other where such an arrangement of units is desired.

It will be further understood that all of the elements entering into a display stand of this character can be cheaply and economically made to the end that such a stand will prove an inexpensive advertising and effective display device.

Having thus described the invention, what is claimed as new is:

1. A knock-down display stand comprising a plurality of shelving or supporting units each comprising a hollow box like structure opened at one side and arranged in superposed relation; certain of said units having a bottom wall provided with elongated ribs projecting inwardly therefrom and other of said units having a bottom wall provided with elongated slots; and all of said units including a front wall, side walls provided in the upper portion thereof with elongated slots, and top walls provided adjacent the respective opposite sides of each unit with a series of spaced openings, substantially U-shaped members arranged vertically in the lowermost units with the closed end of the U resting on said ribs and the free ends of the sides of said U projecting upwardly through selected openings in the top of said lowermost units, and inserted in the slots of the upper units for securing said units together in stepped tiers.

2. A knock-down display stand comprising a plurality of shelving or supporting units each comprising a hollow box like structure opened at one side and arranged in superposed relation; certain of said units having a bottom wall provided with elongated ribs projecting inwardly therefrom and other of said units having a bottom wall provided with elongated slots; and all of said units including a front wall, side walls provided in the upper portion thereof with elongated slots, and top walls provided adjacent the respective opposite sides of each unit with a series of spaced openings, substantially U-shaped members arranged vertically in the lowermost units with the closed end of the U's resting on said ribs and the free ends of the sides of said U's projecting upwardly through selected openings in the top of the lowermost units, and inserted in the slots of the upper units for securing said units together in stepped tiers, and additional means for securing like units together in stepped tiers consisting of rods arranged in said like units and having ends inserted in the slots in the sides of said like units, and also having lateral pins projecting therefrom through openings in the top of adjacent like units and also through slots in the bottom walls of said like units, and wing nuts threadedly engaged with said pins.

3. A knock-down display stand comprising a plurality of shelving or supporting units each comprising a hollow box like structure opened at one side and arranged in superposed relation; certain of said units having a bottom wall provided with elongated ribs projecting inwardly therefrom and other of said units having a bottom wall provided with elongated slots; and all of said units including a front wall, side walls provided in the upper portion thereof with elongated slots, and top walls provided adjacent the respective opposite sides of each unit with a series of spaced openings, substantially U-shaped members arranged vertically in the lowermost units with the closed end of the U's resting on said ribs and the free ends of the sides of said U's projecting upwardly through selected openings in the top of the lowermost units, and inserted in the slots of the upper units for securing said units together in stepped tiers, and additional means for securing like units together in stepped tiers consisting of rods arranged in said like units and having ends inserted in the slots in the sides of said like units, and also having lateral pins projecting therefrom through openings in the top of said like units and also through slots in the bottom walls of adjacent like units, and wing nuts threadedly engaged with said pins, together with standards for the units of each successive tier beginning with the second tier.

4. A knock-down display stand comprising a plurality of shelving or supporting units each comprising a hollow box like structure opened at one side and arranged in superposed relation; certain of said units having a bottom wall provided with elongated ribs projecting inwardly therefrom and other of said units having a bottom wall provided with elongated slots; and all of said units including a front wall, side walls provided in the upper portion thereof with elongated slots, and top walls provided adjacent the respective opposite sides of each unit with a series of spaced openings, substantially U-shaped members arranged vertically in the lowermost units with the closed end of the U's resting on said ribs and the free ends of the sides of said U's projecting upwardly through selected openings in the top of the lowermost units, and inserted in the slots of the upper units for securing said units together in stepped tiers, and additional means for securing like units together in stepped tiers consisting of rods arranged in said like units and having ends inserted in the slots in the sides of said like units, and also having lateral pins projecting therefrom through openings in the top of said like units and also through slots in the bottom walls of adjacent like units, and wing nuts threadedly engaged with said pins, together with standards for the units of each successive tier beginning with the second tier, said standards varying in length each being provided at its upper end with a lateral apertured head bolted to the bottom of a selected unit.

5. A knock-down display stand comprising a plurality of shelving or supporting units each comprising a hollow box like structure opened at one side and arranged in superposed relation; certain of said units having a bottom wall provided with elongated ribs projecting inwardly therefrom and other of said units having a bottom wall provided with elongated slots; and all of said units including a front wall, side walls provided in the upper portion thereof with elongated slots, and top walls provided adjacent the respective opposite sides of each unit with a series of spaced openings, substantially U-shaped members arranged vertically in the lowermost units with the closed end of the U's resting on said ribs and the free ends of the sides of said U's projecting upwardly through selected openings in the top of the lowermost units, and inserted in the slots of the upper units for securing said units together in stepped tiers, and additional means for securing like units together in stepped tiers consisting of rods arranged in said like units and having ends inserted in the slots in the sides of said like units, and also having lateral pins projecting therefrom through openings in the top of adjacent like units and also through slots in the bottom walls of said like units, and wing nuts threadedly engaged with said pins, together with standards for the units of each successive tier beginning with the second tier, said standards varying in length and each comprising a substantially U-shaped member having upstanding sides of a length to extend through the slots in the bottom of one unit and the openings in the top of the same unit, and nuts engageable with the terminals of said sides for securing said one unit to a unit in the next upper tier.

6. A knock-down display stand comprising a plurality of box like units each including a bottom, top, sides and front walls, and each unit having laterally spaced slots in the bottom wall thereof, elongated slots in the side walls thereof adjacent the top of the unit, and a series of spaced openings in the top wall adjacent each of the sides of the units; members for securing the units in predetermined relation comprising rods each of which is arranged in one of the units with the ends of the rods extending through the slots in the sides of said units and said rods also having pins projecting therefrom to extend through selected openings in the top of the associated units and through the slots in the bottom of a second unit for securing the two units together; and standards for supporting the rear portions of tiered units, said standards having parts extended upwardly through the slots in the bottom of one unit, and selected openings in the top of said one unit, and also through the slots in the bottom of the next adjacent upper unit, all in a manner and for the purpose set out.

7. A knock-down display stand comprising a plurality of shelving or supporting units each comprising a hollow box like structure opened at one side and arranged in superposed relation; certain of said units having a bottom wall provided with elongated ribs projecting inwardly therefrom and other of said units having a bottom wall provided with elongated slots; and all of said units including a front wall, side walls provided in the upper portion thereof with elongated slots, and top walls provided adjacent the respective opposite sides of each unit with a series of spaced openings, substantially U-shaped members arranged vertically in the lowermost units with the closed end of the U's resting on said ribs and the free ends of the sides of said U's projecting upwardly through selected openings in the top of the lowermost units, and inserted in the slots of the upper units for securing said units together in stepped tiers, and additional means for securing like units together in stepped tiers consisting of rods arranged in said like units and having ends inserted in the slots in the sides of said like units, and also having lateral pins projecting therefrom through openings in the top of said like units and also through slots in the bottom walls of adjacent like units, and wing nuts threadedly engaged with said pins, certain like units having integral with the bottoms thereof at the open sides of the unit depending supporting-standard sections.

8. A knock-down display stand comprising a plurality of shelving or supporting units each comprising a hollow box like structure opened at one side and arranged in superposed relation; certain of said units having a bottom wall provided with elongated ribs projecting inwardly therefrom and other of said units having a bottom wall provided with elongated slots; and all of said units including a front wall, side walls provided in the upper portion thereof with elongated slots, and top walls provided adjacent the respective opposite sides of each unit with a series of spaced openings, substantially U-shaped members arranged vertically in the lowermost units with the closed end of the U's resting on said ribs and the free ends of the sides of said U's projecting upwardly through selected openings in the top of the lowermost units, and inserted in the slots of the upper units for securing said units together in stepped tiers, and additional means for securing like units together in stepped tiers consisting of rods arranged in said like units and having ends inserted in the slots in the sides of said like units, and also having lateral pins projecting therefrom through openings in the top of said like units and also through slots in the bottom walls of adjacent like units, and wing nuts threadedly engaged with said pins, certain like units having integral with the bottoms thereof at the open sides of the unit depending supporting-standard sections, additional standard sections complemental to the first named standard sections, and means for securing the standard sections of each of said units with its complemental standard sections at the desired longitudinal adjustment relative to one another.

BYRON L. COOKSON.